(12) United States Patent
Dutey

(10) Patent No.: US 6,205,180 B1
(45) Date of Patent: Mar. 20, 2001

(54) DEVICE FOR DEMULTIPLEXING INFORMATION ENCODED ACCORDING TO A MPEG STANDARD

(75) Inventor: Denis Dutey, Herbeys (FR)

(73) Assignee: SGS-Thomson Microelectronics S.A., Gentilly (FR)

( * ) Notice: Subject to any disclaimer, the term of this patent is extended or adjusted under 35 U.S.C. 154(b) by 0 days.

(21) Appl. No.: 08/773,958

(22) Filed: Dec. 26, 1996

(30) Foreign Application Priority Data

Dec. 29, 1995 (FR) .................................................. 95 15864

(51) Int. Cl.⁷ ...................................................... H04N 7/24
(52) U.S. Cl. ...................................................... 375/240.25
(58) Field of Search ............................... 375/240, 240.25; 348/845.1, 423; H04N 7/24

(56) References Cited

U.S. PATENT DOCUMENTS

| | | | |
|---|---|---|---|
| 5,117,288 | 5/1992 | Eisenhardt et al. | 348/409 |
| 5,220,325 * | 6/1993 | Ackland et al. | 341/67 |
| 5,241,382 * | 8/1993 | Paik et al. | 348/426 |
| 5,414,468 * | 5/1995 | Lee | 348/402 |
| 5,521,922 * | 5/1996 | Fujinami et al. | 370/543 |
| 5,598,352 * | 1/1997 | Rosenau et al. | 395/806 |
| 5,684,804 * | 11/1997 | Baronetti et al. | 370/509 |

FOREIGN PATENT DOCUMENTS

| | | | |
|---|---|---|---|
| 0 668 700 | 8/1995 | (EP) | H04N/7/62 |
| 95/07579 * | 3/1995 | (WO) | H04H/1/00 |
| WO 95 32578 | 11/1995 | (WO) | |

OTHER PUBLICATIONS

French Search Report from French Patent Application 95 15864, filed Dec. 29, 1995.

* cited by examiner

Primary Examiner—Howard Britton
(74) Attorney, Agent, or Firm—Wolf, Greenfield & Sacks, P.C.; James H. Morris; Theodore E. Galanthay

(57) ABSTRACT

A device for demultiplexing data encoded according to a MPEG standard in the form of a data flow including system and picture packets. The device includes means for independently organizing, according to the nature (system packet, video packet, audio packet, etc.) of the data included in the packets, the storing of the data in various registers, some of the registers being accessible in read mode by a RAM and other registers being accessible by a microprocessor.

11 Claims, 6 Drawing Sheets

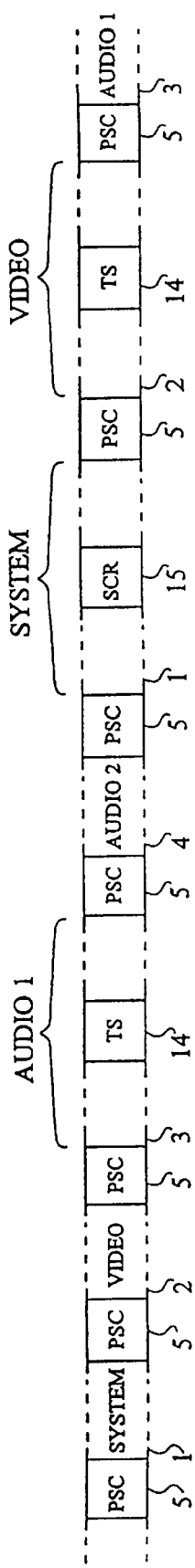
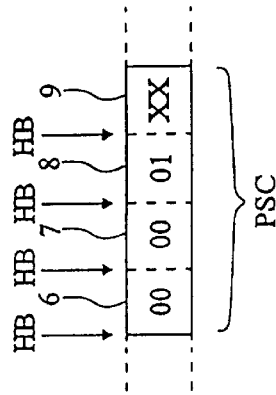
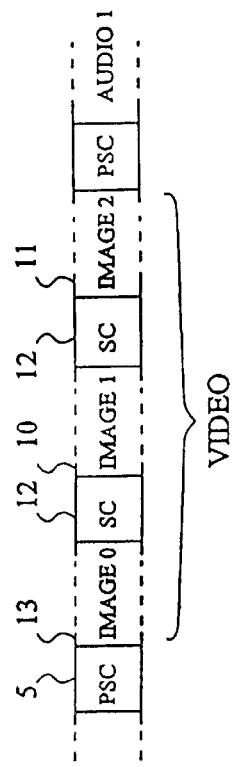
FIG. 1
FIG. 2
FIG. 3

DEVICE FOR DEMULTIPLEXING INFORMATION ENCODED ACCORDING TO A MPEG STANDARD

BACKGROUND OF THE INVENTION

1. Field of the Invention

The present invention relates to a device for demultiplexing motion picture data, including audio and video data, encoded according to a MPEG standard.

2. Discussion of the Related Art

MPEG standards determine the encoding and decoding conditions of motion pictures in the form of a flow of video digital data and a flow of audio digital data. The standards define the encoding conditions of motion pictures, whether associated or not with a sound signal, for storing in a memory and/or for transmitting, for example using Hertzian waves. The standards also define the encoding conditions of the individual picture sequences that form the motion picture to be restored on a screen. Digital pictures are encoded in order to decrease the amount of corresponding data. Encoding generally uses compression techniques and motion estimation. MPEG standards are, for example, used to store picture sequences on laser compact disks, interactive or not, or on magnetic tapes. MPEG standards are also used to transmit pictures, for example, on telephone lines or through Hertzian waves.

The encoding and decoding conditions, defined by MPEG standards, can be obtained from standard organizations; so, only the criteria necessary to understand the present invention is described herein.

The decoding of data encoded according to one of the MPEG standards uses a separation of the data included in the data flow according to its nature. In particular, the video data is separated from audio data, if any, and the audio and video data are separately decoded in suitable audio and video decoders. The data flow also includes system data. The system data includes information relating to the encoding conditions of the data flow and is used to configure the video and audio decoder(s) so that they correctly decode the video and audio data.

Thus, the present invention more particularly applies to the separation of the various data included in the data flow according to their nature. The separation is called the system layer. The system, audio and video data are separated before the individual decoding of the audio and video data.

FIG. 1 represents an exemplary data flow encoded according to MPEG standards. As shown in FIG. 1, the data flow encoded according to MPEG standards includes picture data and system data 1 grouped in packets. The picture data includes video data packets (VIDEO) 2 and, possibly, audio data packets (AUDIO1, AUDIO2) 3 and 4. Several packets of video and/or audio data can be interposed between two packets of system data 1.

In the represented example, two types of audio packets 3 and 4, respectively, are present. Packets 3 and 4 are, for example, audio frames corresponding to two different languages. It should be noted that the data flow can also include various types of video packets. When the data flow includes a plurality of types of video and/or audio data, each packet of a given type is assigned to a respective video decoder, and/or respective audio decoder. In other words, all the video or audio data of a packet of the same type are to be decoded by a predetermined decoder. Each packet, including either system data or picture data (video or audio), starts with a packet start code (PSC) 5.

As shown in FIG. 2, the PSC is a 4-byte code. The first three bytes 6, 7 and 8 are used to identify a PSC, and the fourth byte 9 identifies, in particular, the nature and the type of the related packet. In FIG. 2, the bytes are represented by their hexadecimal value. Thus, the first three bytes 6, 7 and 8 include values "00", "00" and "01", respectively, whereas the fourth byte 9 includes a value "XX" identifying both the nature of the packet (system, video, audio, user data) and the destination of the data included in the packet.

A single packet of picture data (video or audio), may include a plurality of video sequences, or audio sequences, respectively. A packet of video data 2 may include, for example, the data relative to several groups of pictures, to a plurality of pictures or to a plurality of sub-pictures, or macroblocks. An audio packet 3 or 4 may include data related to several audio frames. It should thus be noted that the arrangement in packets of the data flow is independent of the order of picture data. In other words, a picture packet may include data related to several pictures. Also, data related to a single picture may be included in several successive packets.

FIG. 3 illustrates an exemplary content of a video packet. The packet starts with a PSC code 5. The packet includes several sequences, IMAGE1 10, IMAGE2 11, of video data, each sequence starting with a start code SC 12. In the represented example, a sequence IMAGE0 13 ends in the represented packet. Thus, the SC code related to the sequence IMAGE0 was included in a video packet of the same type, which preceded the represented packet in the data flow.

The data flow also includes synchronization data for achieving both the synchronization of the sound with respect to the picture and the synchronization of the decoding rate at which the pictures have been encoded. Indeed, the duration of the data representing a picture varies from one picture to another.

Time synchronization TS 14 (FIG. 1) strobes can be included in the various picture packets 2, 3 or 4. The synchronization strobes are predominantly used to synchronize the video or audio decoder to which a picture packet is assigned. Two main types of synchronization strobes 14 are associated with the picture packets. PTS strobes indicate the time position, or display date of the picture provided by the decoding of the first picture included in the packet. For a video packet 2, it is, for example, the date at which the picture, whose code is located after the first SC picture start code 12 included in the packet must be displayed. For an audio packet 3 or 4, it is the date at which it is required to restore (play), once decoded, the first audio frame included in the packet. The synchronization strobe may also be a DTS strobe indicating the time position, or date, of the decoding of the first picture included in the packet (decoding having been previously performed according to a different display order).

SCR strobes 15 for synchronizing the system data can be included in the system packets 1. The SCR strobes of the system clock are mainly used to synchronize the decoding rate of the pictures with respect to their encoding rate.

Each system packet 1 or picture packet 2, 3 or 4 does not necessarily include a time strobe. MPEG standards determine the maximum time difference (for example, 0.7 second) which may separate, in the data flow, two successive time strobes TS 14 or SCR 15 of the same packet type.

The main role of the system layer of a MPEG decoder is to separate the data packets while maintaining synchronization of the sound with respect to the picture and the synchronization of the reference or display rate of the pictures with respect to the rate at which they are encoded.

Conventionally, the separation, or sorting, of data packets included in the data flow encoded according to one of the MPEG standards is achieved by the software of a microprocessor included in the picture restoring unit. Such a unit is, for example, a microcomputer including, as peripheral device, a compact disk player.

A drawback of the conventional processing of the system layer results from the need to use a very fast microprocessor capable of processing data flow in real time. A further drawback, especially present when the restoring device is a microcomputer likely to have other tasks, is that the processing of the system layer monopolizes the microcomputer. The microcomputer is then no longer capable of performing other programs or tasks except if the picture display speed is not given precedence. Indeed, to comply with the display speed, the interruptions generated by the system layer should have priority over the other interruptions.

SUMMARY OF THE INVENTION

An object of the present invention is to provide a demultiplexing device, according to the nature of data included in a picture data flow received by a MPEG decoder, using a microprocessor as little as possible.

A further object of the present invention is to provide the separation of a plurality of groups of audio and/or video data assigned to various audio and/or video decoders.

The invention further aims at allowing a user to introduce parameters into the demultiplexing device.

The invention further aims at making accessible all the data that is needed to synchronize the pictures without using the microprocessor.

The invention further aims at verifying the integrity of sequences of picture data, prior to their decoding and without using the microprocessor.

To achieve these objects, an embodiment of the present invention provides a device for demultiplexing data encoded in the form of a flow of system and picture data packets according to a MPEG standard, including means for independently organizing, according to the nature of the data included in the packets, a storing of the data in various registers, some of the registers being accessible in read mode by a RAM and, some other registers being accessible by a microprocessor.

According to an embodiment of the present invention, the demultiplexing device is associated with a first buffer register for containing packets of video data of a single type, with a second buffer register for containing packets of audio data of a single type, and with a third buffer register for containing at least packets of pictures of a different type, the first and second buffer registers being accessible, in read mode, by the RAM, and the third buffer register being accessible, in read mode, by the microprocessor.

According to an embodiment of the present invention, the organization means includes a hardwired logic state machine which receives the data flow and searches for packet start codes for transmission to the buffer registers.

According to a further embodiment of the present invention, the demultiplexing device includes a register for counting the length of the packets to switch the state machine between an operation mode wherein the state machine searches for the occurrence of a packet start code and an operation mode wherein the state machine transmits the data to one of the buffer registers.

According to an embodiment of the present invention, the demultiplexing device includes means so that, in the data transmission mode, the storing of data in one of the first three buffer registers includes the storing of the start code of the related packet.

According to an embodiment of the present invention, the above means includes a first shift register of the data provided by the state machine and a second shift register of the signals for controlling the writing in the first three buffer registers, the second shift register being associated with a multiplexer inhibiting, during the first three bytes of each packet start code, the shift achieved by the second register.

According to an embodiment of the present invention, the third buffer register is designed to include all the packets of a data flow which are not routed to one of the first two buffer registers by the state machine.

According to an embodiment of the present invention, the demultiplexing device includes fourth and fifth buffer registers designed to include time strobes likely to be present in picture packets stored in the first and second buffer registers, the fourth and fifth registers being controlled, in write mode, by the state machine and being accessible, in read mode, by the microprocessor.

According to an embodiment of the present invention, the demultiplexing device includes a register to store the time references included in system packets, the time reference storing register being accessible by the microprocessor.

According to a further embodiment of the present invention, the demultiplexing device includes a register, controllable by the microprocessor, to configure the state machine.

According to a still further embodiment of the present invention, the demultiplexing device includes a register of interruptions generated by the state machine, the register of interruptions being accessible by the microprocessor.

According to an embodiment of the present invention, the demultiplexing device further includes an error input, adapted to receive an error signal generated by a unit which transmits the data flow, the error signal being interpreted by the state machine to stop, by itself, the transmission of data to one of the first three buffer registers and search for a new packet start code.

The foregoing and other objects, features, aspects and advantages of the invention will become apparent from the following detailed description of a preferred, non-limiting embodiment of the present invention described by way of example with reference to the accompanying drawings, in which:

BRIEF DESCRIPTION OF THE DRAWINGS

FIG. 1 illustrates an exemplary data flow encoded according to MPEG standards;

FIG. 2 illustrates a packet start code according to MPEG standards;

FIG. 3 illustraters an exemplary video packet according to MPEG standards;

DETAILED DESCRIPTION

Figure 4:
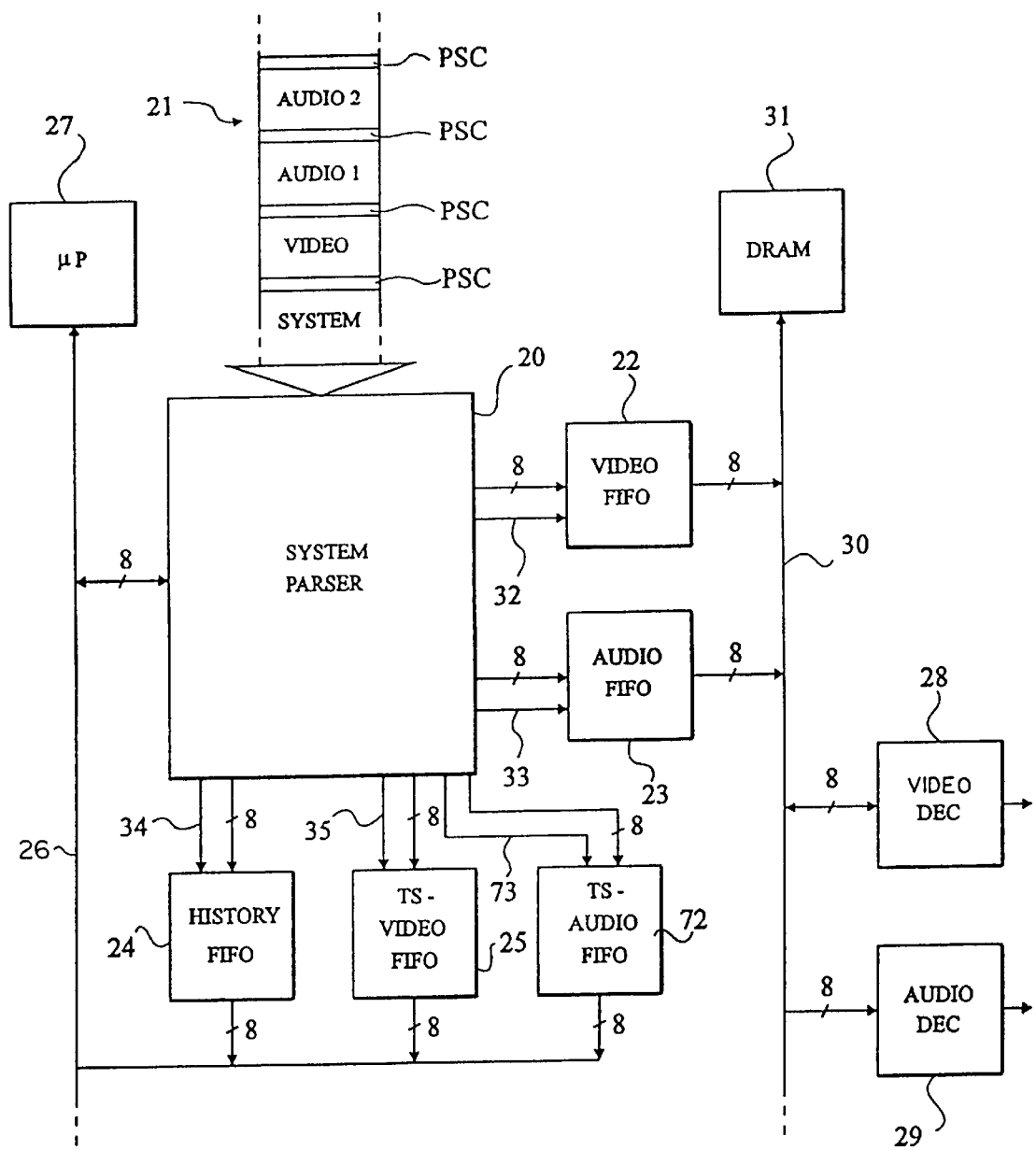
FIG. 4 is a block diagram illustrating an architecture of a MPEG decoder including a device for demultiplexing data included in the data flow according to an embodiment of the present invention.

For the sake of clarity, the same elements are designated with the same references in the various drawings. Also, only the elements and connections necessary to understand the invention are represented in the drawings.

FIG. 4 schematically represents an architecture of a MPEG decoder including a demultiplexing device (SYSTEM_PARSER) 20 according to an embodiment of the present invention.

Device 20 receives, for example, an 8-bit data flow 21 encoded according to MPEG standards. The data flow 21 includes, as disclosed with relation to FIGS. 1–3, packets of system, video and audio data.

The device 20, according to the invention, operates to separate, or to demultiplex, the data flow 21 according to the nature of the data included in the various packets. Device 20 is associated with four buffer registers 22, 23, 24 and 25 in which are temporarily stored the data included in flow 21 as a function of their nature.

Device 20 communicates, through a bus 26, with a microprocessor (μP) 27, for example of a microcomputer. This communication is used to transmit to the microprocessor 27 data included in the system packets 1 (FIG. 1) and to introduce parameters into device 20. The system data mainly includes data allowing the microprocessor 27 to configure the video (VIDEO_DEC) and audio decoders (AUDIO_DEC), 28 and 29, respectively.

A first register (VIDEO_FIFO) 22 includes packets of video data 2 (FIG. 1). A memory controller (not shown) clears register 22 as it is filled and stores the video data, via a bus 30, in a first area of a RAM 31, for example a dynamic memory DRAM, assigned to the compressed video data. Register 22 includes only the video data assigned to the video decoder 28.

A second register (AUDIO_FIFO) 23 includes the packets of audio data 3. Like register 22, register 23 is cleared by the memory controller to store the audio data in a second area of memory 31 assigned to compressed audio data.

Decoders 28 and 29 are conventional video and audio decoders, whose operation will not be described in more detail. The video decoder 28 is designed to restore and transmit decoded pictures to a video encoder (not shown) which provides a composite video signal to display the decoded pictures on a display screen, for example a video monitor (not shown). The audio decoder 29 is designed to restore and transmit the decoded audio frames to a digital-to-analog converter (not shown) which provides an audio analog signal to restore the audio signal associated with the pictures.

It should be noted that, in the case where the data flow 21 includes a plurality of types of audio packets (for example 3 and 4, as in FIG. 1), the decoder 29 is associated with only one of the types of packets. In other words, register 23 receives only one type of audio data, for example data AUDIO1 (FIG. 1), to be decoded by decoder 29.

A third register (HISTORY_FIFO) 24 is, according to an embodiment of the present invention, designed to store all the other data present in the data flow 21 which is not compressed video or audio data assigned to decoders 28 or 29. The data included in register 24 is available, through bus 26, and can be accessed by the user, for example, to decode a second audio message AUDIO2 (FIG. 1), through an additional audio decoder (not shown).

An advantage of the present invention is to allow the recovery, in a flow of encoded data 21, of a flow of audio data and/or video data without it being necessary to process the system layer again. The additional flow could be, for example, a second audio message AUDIO2 in a language different from the one of message AUDIO1 included in register 23. The user could then decode, through a second audio decoder, the second audio message, without it being necessary to provide an additional device for separating data according to their nature.

A fourth register (TS_VIDEO_FIFO) 25 receives, according to the invention, the time references TS included in the video packets 2 assigned to decoder 28. Register 25 maintains references TS to ensure synchronization of the sound with respect to the picture between two occurrences of a same time reference and to compensate for a possible deviation between the encoder and the decoder, because, as disclosed with relation to FIGS. 1–3, the data flow 21 can include a plurality of pictures between two time references TS. A plurality of pictures can then be stored in memory 31 and the pictures will be synchronized between two occurrences of time references. The size of register 25 depends upon the maximum number of pictures that may be present in memory 31. Several time references TS may arrive in the data flow 21 before the first time reference is used to decode the picture associated therewith.

A fifth register (TS_AUDIO_FIFO) 72 receives, according to the invention, the time references TS included in the audio packets 4 assigned to decoder 29. The role and operation of register 72 is the same as disclosed above for register 25. The third 24, fourth 25 and fifth 72 registers are accessible by the microprocessor 27 through bus 26.

In the embodiment represented in FIG. 4, all the data (system, video, and audio) is 8-bit data. The connections of the data between the various elements associated with device 20 are thus achieved on eight bits.

Device 20 includes, according to the invention, a hard-wired state machine 40 (FIG. 5) designed to route the data arriving in the flow 21 toward one of registers 22, 23, 24, 25 or 72 depending upon the nature of the data. Device 20 thus provides each register 22, 23, 24, 25 or 72, with a write control signal 32, 33, 34, 35 and 73, respectively, to the respective register. As indicated above, registers 22 and 23 are read under the control of the memory controller, whereas, in contrast, registers 24, 25 and 72 are read under the control of the microprocessor 27.

An advantage of the present invention is that the demultiplexing according to the nature of the data included in the data flow 21 is achieved without using the microprocessor 27. Of course, the microprocessor 27 still operates to configure the video decoder 28 and audio decoder 29 as a function of the system data included in packets 1 and to synchronize decoders 28 and 29 depending upon the time strobes. However, the system data and synchronization data are stored in registers 24, 25 and 72, which allows a large degree of operational flexibility for the user.

A further advantage of the present invention is that the storing in register 24 of all the data which is not assigned to registers 22 and 23 significantly simplifies the processing of additional possible data that may be included in the data flow 21. Register 24 can therefore be used, for example, as a secondary data flow for an additional MPEG decoder (audio and/or video).

Figure 5:
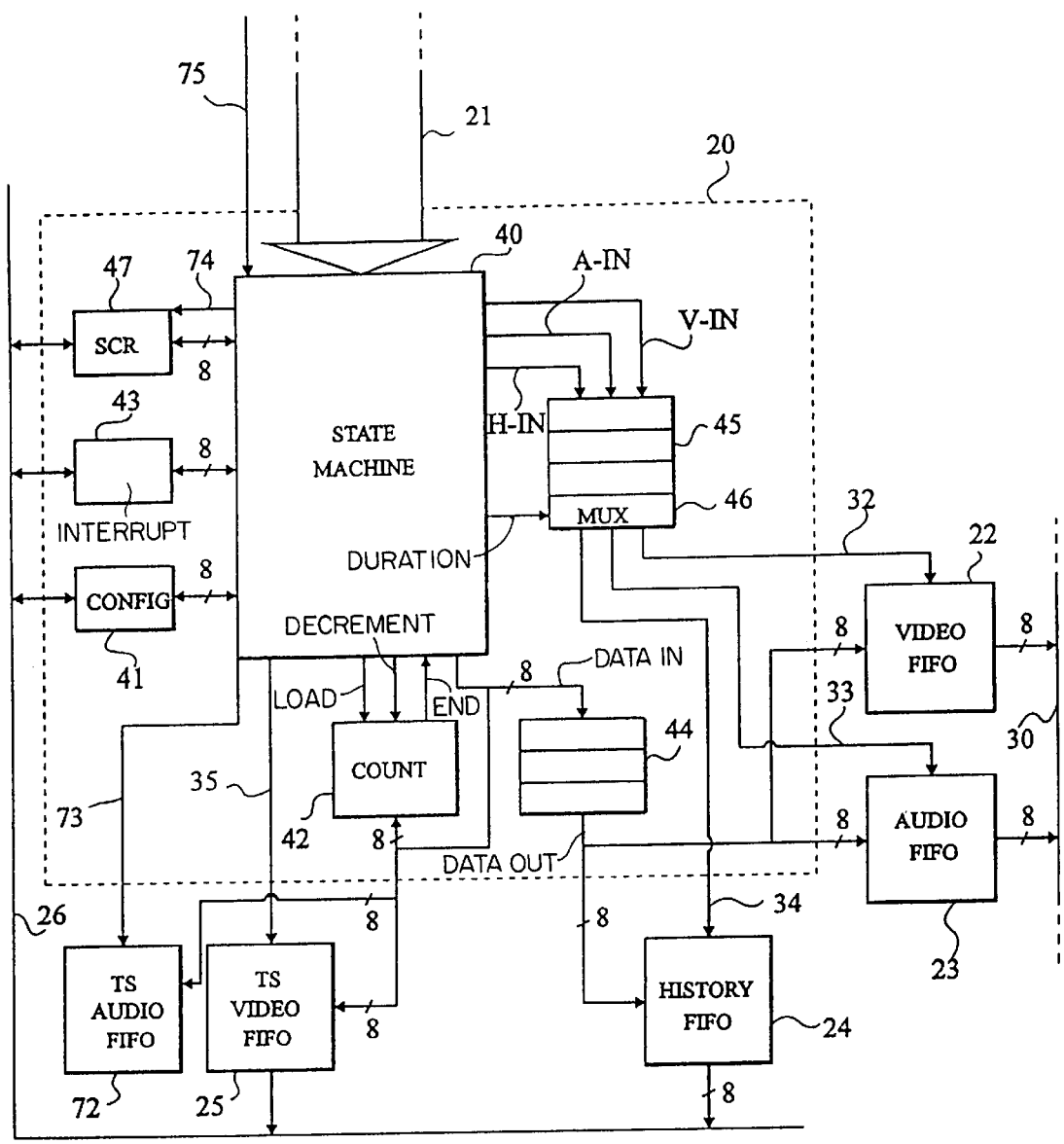
FIG. 5 is a block diagram illustrating a demultiplexing device according to an embodiment of the present invention.

FIG. 5 schematically represents an embodiment of a demultiplexing device 20 such as represented in FIG. 4. Device 20, according to an embodiment of the present invention, includes a state machine (STATE_MACHINE) 40 which receives the data flow 21 encoded according to an MPEG standard (MPEG-1, MPEG-2, MPEG-4) According to an embodiment of the present invention, the hardwired state machine 40 is designed to separate the data packets, according to their nature, by processing, by itself, the flags or start codes PSC (FIGS. 1 and 2) to separate the packets. The various packets are routed by the state machine 40 to various buffer registers 22, 23, 24, 25 and 72, depending upon the nature of the data they contain.

The main task of the state machine 40 is to search, the data flow 21 for the packet start codes (PSC). At the occurrence of a PSC, the state machine 40 identifies the nature of the packet. For this purpose, the machine 40 is associated with a configuration register (CONFIG) 41 that is programmable by the microprocessor 27 (FIG. 4). Register 41 configures the state machine 40 to determine the packet types which should be stored in registers 22 and 23, because the data flow 21 may include several types of video and/or audio packets. Only one type of packets is to be routed to each video decoder 28 and each audio decoder 29, respectively, that is associated with device 20. Thus, as a function of the content of the fourth byte 9 (FIG. 2) of the PSC and the content of register 41, the state machine 40 determines whether the packet, for example audio, should be stored in register 23, because the packet contains an audio frame that is to be decoded by decoder 29, or in register 24, because the packet contains another audio frame.

For example, values "E0" to "EF" of the fourth byte 9 designate a video packet. Values "C0" to "CF" designate, for example, an audio packet AUDIO1 that should be decoded by decoder 29. Values "D0" to "DF" designate, for example, an audio packet AUDIO2.

A distinctive feature of the present invention is that the demultiplexing device 20 does not continuously examine the data flow 21 to search for a PSC. Indeed, a sequence identical to that of a PSC may be present in an audio packet. In such a case, this sequence should not be considered by the state machine 40 as a PSC but as data to be stored in one of the registers.

To achieve this purpose, advantage is taken of the fact that all PSCs are immediately followed by two bytes indicating the length of the packet. These two bytes are stored, according to an embodiment of the present invention, in a counting register (COUNT) 42. Thus, at the turn on of device 20, or once device 20 is reinitialized, the state machine 40 is set to an operation mode where the machine searches for the occurrence of a PSC. As soon as such a PSC occurs in the data flow 21, the state machine 40 controls, by a signal LOAD, the writing of the two bytes which follow the PSC in register 42. The state machine is then set to an operation mode where it transmits the data to one of the buffer registers 22, 23 or 24. In transmission mode, the value contained in register 42 is decremented, at each new incoming data, by a signal DECREMENT. When the value contained in register 42 reaches 0, register 42 issues a signal END indicating the end of the current packet.

Signal END is used, in the state machine 40, to set the sate machine back into a PSC search mode. In other words, the state machine 40 searches, according to the invention, for a PSC, only when signal END is in an active state indicating that a packet just ended. Thus, an advantage of the present invention is that the demultiplexing device 20, by itself, does not consider as a PSC, a sequence of data contained in a packet.

A further advantage of the present invention is that an operation error is easily identified by using the information provided by signal END. For example, if the occurrence of an active state on signal END is not followed by a sequence "00 00 01" (in hexadecimal) indicating a PSC, then the state machine 40 generates an interrupt. To make use of this feature, the state machine 40 is associated with an interrupt control register 43 that can be read by the microprocessor 27 through bus 26.

Since the first three bytes 6, 7 and 8 (FIG. 2) of a PSC are always identical, it is only at the fourth bit clock cycle of the data flow 21 that the device 20 can identify in which register 22, 23 or 24 the packet following the PSC should be stored.

In order to redistribute all the data to the various registers, the data output DATA_IN of the state machine 40 is provided to a first shift register 44. Register 44 shifts, by three bit clock cycles, the data DATA_IN present at the output of the state machine 40. The output of register 44 is transmitted to the data inputs of registers 22, 23 and 24. Thus, all the data liable to be stored in one of the registers is shifted by three bit clock cycles with respect to their occurrence in the data flow 21.

The state machine 40 generates, in synchronization with the bit clock, three signals V_IN, A_IN, and H_IN to select the register, 22, 23 and 24, respectively in which the packets are to be stored. As with data DATA_IN, the signals are shifted by three cycles, in a second shift register 45 associated with a multiplexer 46. Signals V_IN, A_IN, and H_IN may be in an active state, for example "1", only after the first three bytes of a PSC. In other words, signals V_IN, A_IN, and H_IN are set to state "0" during a sequence "00 00 01" following a passage to state "1" of the signal END. Multiplexer 46 directly (without shift) transmits signals V_IN, A_IN, and H_IN during the first three bytes of a PSC. This allows to store the sequence "00 00 01" in register 22, 23 or 24 to which it should be associated with the fourth byte 9 indicating the nature of the packet. Multiplexer 46 is controlled by a signal DURATION, provided by the state machine 40, and active during three bit clock cycles from the fourth byte 9 of a PSC. Three outputs of multiplexer 46 form signals 32, 33 and 34 controlling the writing in registers 22, 23 and 24, respectively. Of course, two of signals V_IN, A_IN, and H_IN, pertaining to signals 32, 33 and 34, cannot be simultaneously in an active state.

Figure 6:
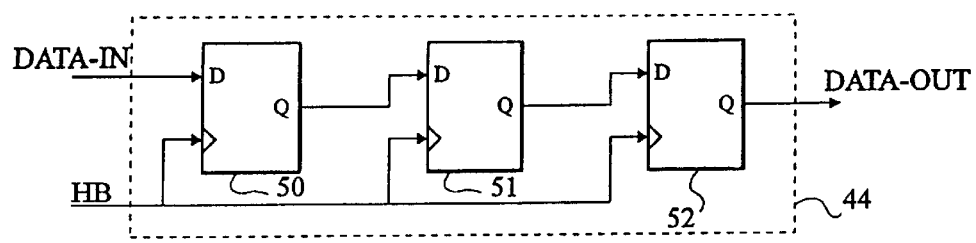
FIG. 6 illustrates a shift register for shifting packet start codes of the data flow received in a demultiplexing device according to an embodiment of the present invention.
Figure 7:
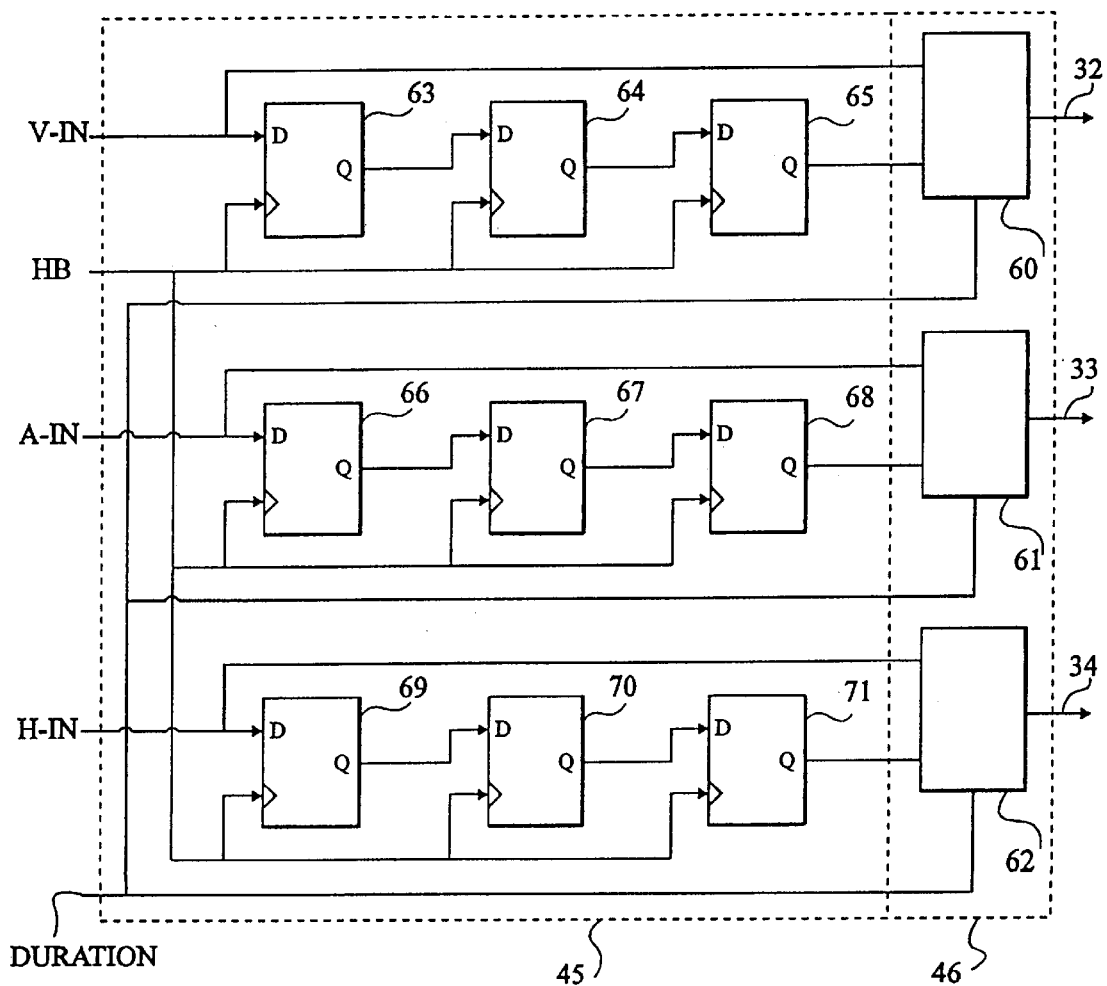
FIG. 7 illustrates a register for shifting received data included in a demultiplexing device according to an embodiment of the present invention.
Figure 8:
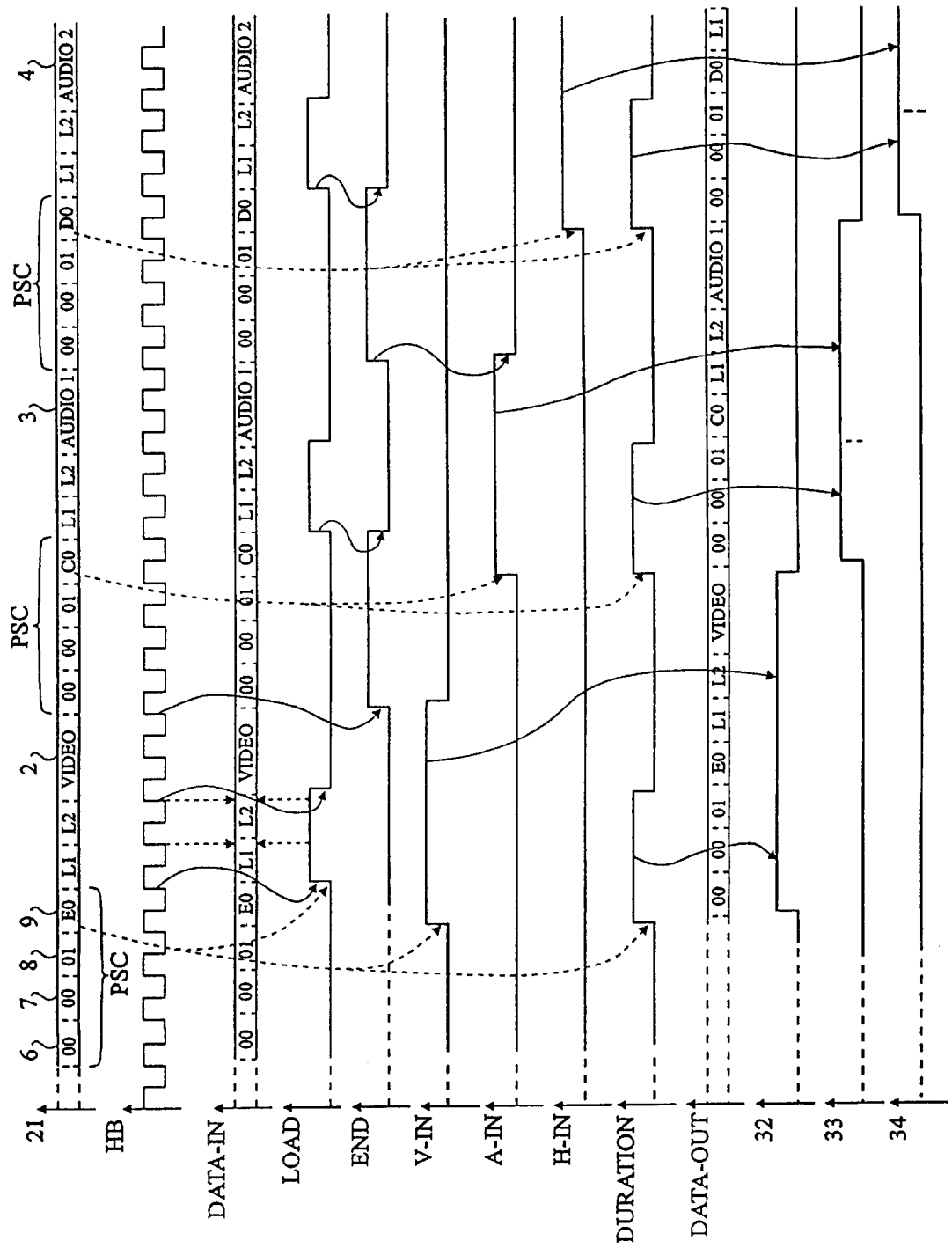
FIG. 8 illustrates timing diagrams of the normal operation of a demultiplexing device according to an embodiment of the present invention.

The operation of registers 44 and 45 and of multiplexer 46 will be better understood with relation to FIGS. 6–8. Signal 35 and signal 73, controlling in the write mode, registers 25 and 72, respectively, are provided by the state machine 40 at the occurrence of a time strobe TS in a video or audio packet, respectively, stored in registers 22 or 23, respectively. In other words, signals 35 and 73 are respectively in an active state when the state machine detects a reference TS in a video or audio packet and when signal 32 or 33, respectively, is in an active state.

Preferably, device 20 further includes a register (SCR) 47 storing the time references SCR contained in system packets. Writing in register 47 is controlled by the state machine 40 by a control signal 74 and reading is achieved by the microprocessor 27 via bus 26.

The operation of the state machine 40 can be considered as a "token" flowing from state to state as a function of the syntax of the data flow 21. When the "token" is in a state "TS VIDEO" or "TS AUDIO", it indicates that the byte of flow 21 coming into the state machine 40 is a time strobe. Signal 35 or signal 73, respectively, is activated and prompts register 25 or register 72, respectively, to store the data. In the same way, when the "token" is in a state "SCR" after a specific sequence of data, signal 74 is activated and prompts register 47 to store the data present in flow 21.

FIG. 6 represents an embodiment of the first shift register 44. Register 44 is formed by three D-type flip-flops 50, 51 and 52 connected in series and having clock inputs that receive the bit clock HB. The data signal DATA_IN, at the output of the state machine 40 (FIG. 5), is received on the D input of a first flip-flop 50. The output Q of flip-flop 50 is connected to the input D of a second flip-flop 51. The output Q of flip-flop 51 is connected to the input D of a third flip-flop 52. The output Q of flip-flop 52 forms signal DATA_OUT provided to the data inputs of registers 22, 23 and 24 (FIG. 5).

FIG. 7 represents an embodiment of the second shift register 45 associated with the multiplexer 46. Register 45 is formed by three series of D-type flip-flops, each series being associated with one of the signals V_IN, A_IN, and H_IN. Also, multiplexer 46 is formed by three multiplexers 60, 61 and 62, each being associated with one of signals V_IN, A_IN, and H_IN and with a respective one of the series of D-type flip-flops. All the flip-flops receive, at their clock input, the bit clock signal HB.

A first series of flip-flops operates to shift signal V_IN through three D-type flip-flops 63, 64 and 65 connected in series as in register 44 (FIG. 6). The input D of a first flipflop 63 receives signal V_IN. The output Q of flip-flop 63 is connected to the input D of a second flip-flop 64, whose output Q is connected to the input D of a third flip-flop 65. The output Q of flip-flop 65 is transmitted to a first input of a first multiplexer 60, whose second input receives signal V_IN. The output of multiplexer 60 forms signal 32 controlling the writing in register 22 (FIGS. 4 and 5). The selection between the inputs of multiplexer 60 is controlled by the signal DURATION, the first input being selected when signal DURATION is low.

A similar diagram is reproduced for the two other series of D-type flip-flops. A second series of flip-flops shifts signal A_IN through three flip-flops 66, 67 and 68 and is associated with a second multiplexer 61, whose output forms signal 33 controlling the writing in register 23. A third series of flip-flops shifts signal H_IN through three flip-flops 69, 70 and 71 and is associated with a third multiplexer 62, whose output forms signal 34 controlling the writing in register 24.

FIG. 8 shows time diagrams illustrating the operation of the demultiplexer according to embodiment of the present invention represented in FIGS. 5–7. FIG. 8 represents the waveform of signals DATA_IN, LOAD, END, V_IN, A_IN, H_IN, DURATION, DATA_OUT, 32, 33 and 34 during an exemplary data flow 21. Signal DECREMENT, provided to the counting register 42 (FIG. 5) is not represented since it approximately corresponds to the represented bit clock signal HB. In this example, it is assumed that decoders 28 and 29 (FIG. 4) are assigned to decode packets VIDEO and AUDIO1, respectively identified by values "E0" and "C0". Packet AUDIO2, identified by value "D0" and represented in FIG. 8, will then to be stored in register 24. For the sake of clarity, the represented example of data flow 21 does not include time strobes TS or SCR. It should be simply noted that at the occurrence of a time strobe TS in a video or audio packet, the strobe is stored in registers 22, respectively 23 or 24, and also in register 25 or 72. Also, the time diagrams of FIG. 8 are not drawn to scale. In particular, the durations of sequences VIDEO, AUDIO1 and AUDIO2 are in practice, substantially longer (for example 200 clock cycles HB).

Signal DATA_IN corresponds to the data flow 21 with a small delay generated by the crossing of the hardwired logic formed by the state machine 40. It should be noted that the delay is not impairing and is, on the contrary, used according to the invention so that at each rising edge of clock HB controlling the writing in the various registers, the data is steady at the input of the registers. However, care should be taken so that the delay generated by the state machine 40 is shorter than a period of signal HB.

As shown in FIG. 8, signal LOAD is set to the high state at the rising edge of signal HB following the identification of a packet start code (PSC). Signal LOAD remains at a high state during two cycles of signal HB to allow the loading of two bytes L1 and L2 which include the length of the packet in the counting register 42. Signal END is set to a high state when register 42 reaches value 0. Signal END remains high as long as register 42 is not loaded by a new value, i.e., as long as signal LOAD is not set again to a high state.

Signals V_IN, A_IN, and H_IN are set to a low state during the first three bytes "00", "00" and "01" of the data flow 21 following the setting to a high state of signal END. Signals V_IN, A_IN, and H_IN are set to a high state as a function of the value included in the fourth byte 9 of the PSC. Once at a high state, signal V_IN, A_IN, or H_IN is set again to a low state at the end of the packet. The setting to state "0" of signals V_IN, A_IN, and H_IN is, for example, caused by the setting to a high state of signal END.

The occurrence of a PSC identified in the data flow 21 causes the signal DURATION to be set to a high state. In other words, signal DURATION is set to a high state at the occurrence of the fourth byte 9 of a start code PSC, and remains high during three cycles HB.

Data DATA_OUT, at the output of register 44, are shifted by three clock cycles HB with respect to data DATA_IN.

Thus, signal DURATION is high during the first three bytes 6, 7 and 8 of a PSC of signal DATA_OUT.

Because of the selection in multiplexers 60, 61 and 62 (FIG. 7), the shift generated by the series of flip-flops is inhibited when signal DURATION is high. Thus, signals 32, 33 and 34 reproduce, without shift, signals V_IN, A_IN, and H_IN, respectively, when signal DURATION is high. Once signal DURATION is set again to a low state, signals 32, 33 and 34 reproduce, with a shift of three cycles of signal HB, signals V_IN, A_IN, and H_IN, respectively. The signal among signals 32, 33 or 34 which has to be set to a high state to control register 22, 23 or 24, respectively, with which it is associated, is thus high during the duration of signal V_IN, A_IN, or H_IN associated therewith and increased by three cycles of signal HB. Thus, each packet is stored with its PSC.

At the end (not shown) of the data flow 21, MPEG standards provide a specific code having the same sequence as a PSC: "00", "00", "01", "B9". At the occurrence of such a code, while searching for a start code, the state machine 40 can, according to the invention, generate an interrupt to the microprocessor, through register 43 (FIG. 5).

When a system packet (not shown) occurs in the data flow 21, the packet may also be stored in register 24. Thus, the demultiplexing device 20 according to the invention permits reuse of the content of register HISTORY 24 as data flow for an identical demultiplexing device in order to decode other types of packets. The content of register 24 then includes, taking into account the sequence and rate of the data flow 21, all the data necessary to decode the packets. In the case where a single type of additional data is present in the data flow 21 (for example packets AUDIO2 representing audio frames in other languages as those included in packets AUDIO1), it is however unnecessary to use an additional demultiplexing device. Indeed, in this case, by storing in register 24 only the packets AUDIO2, the content of the register 24 can be provided to an additional audio decoder without it being necessary to use another demultiplexing device. The operation in storing mode of system packets in register 24 is, according to the invention, configured by a register 41 configuring the state machine 40.

An advantage of the present invention is that the demultiplexing device 20, while decreasing the utilization of the microprocessor to process the system layer, can include parameters as a function of its applications.

A further advantage of the present invention is that the demultiplexing device 20 provides all the main elements of the system layer of the data flow 21. The demultiplexing device 20 can thus, according to the invention, be used in a large number of applications by configuring its state machine 40 in a suitable way and by using the various data, in particular the time strobes SCR and TS, provided by the device 20.

A still further advantage of the present invention is that the demultiplexing device 20 can detect errors independently of the microprocessor. In addition to the detection of erroneous start codes already referred to, the device 20 can, for example, optimize error detection achieved upstream by the device which provides the data flow 21.

For this purpose, the demultiplexing device 20 receives, according to the invention, an error signal 75 generated by the device providing the data flow 21. The state machine 40 is then arranged to take into account the state of this signal.

Figure 9:
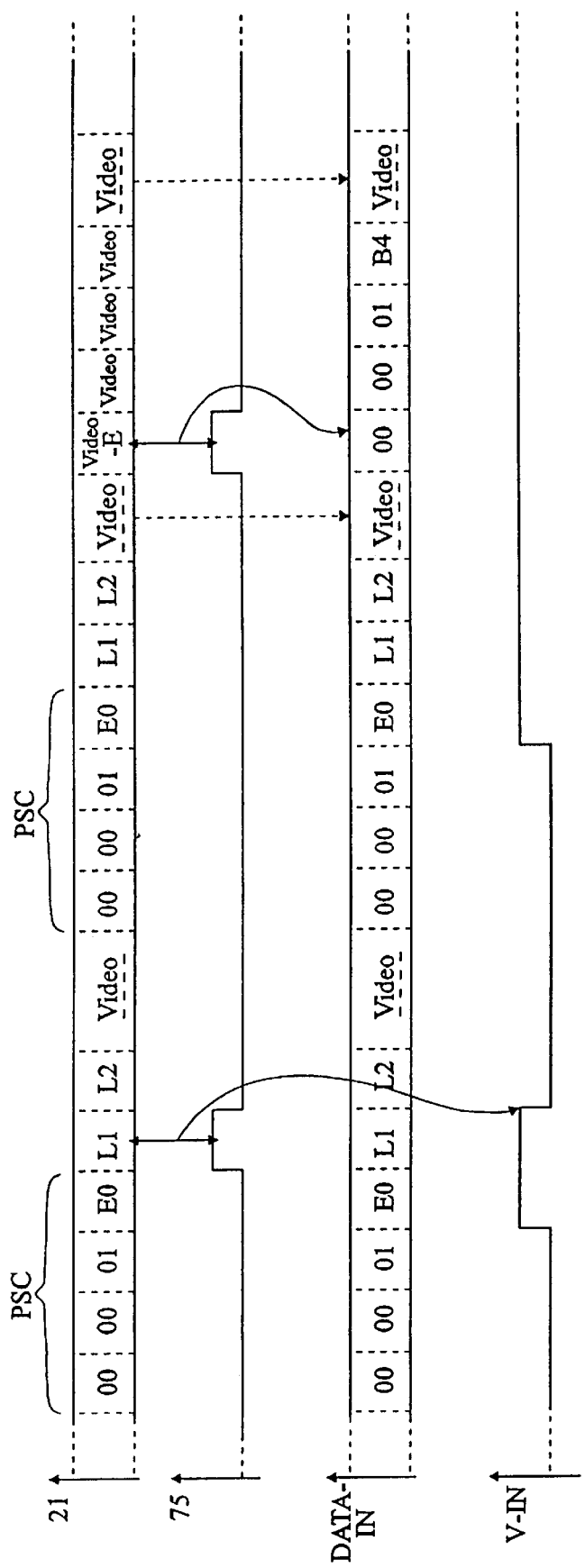
FIG. 9 illustrates timing diagrams of the operation of a demultiplexing device according to an embodiment of the present invention, in the case of an error in the data flow.

FIG. 9 illustrates time diagrams of the operation of the device according to the invention in the case of an error indicated by signal 75, and represents signals 75, DATA_IN, and V_IN during an exemplary data flow 21 including errors. In FIG. 9, it is assumed, for example, that the data flow 21 is provided by a compact disk player. In such a case, the data flow received by device 20 is provided by a CDROM decoder which detects and corrects some errors by itself. When the CDROM decoder detects an error it is incapable of correcting, the CDROM decoder will transmit the erroneous data but may also activate an error signal 75 during the bit clock cycle HB corresponding to the erroneous data. When this is the case, it is possible to ensure that the state machine 40 uses this error signal to either go back to a packet start code search mode, or to continue to process the packet while informing the microprocessor of the error through the interrupt register 43.

If the error signal occurs on a so-called critical data (first data L1 in FIG. 9), for example a byte of the start code, a packet length code or a time reference, the state machine 40 is immediately reset to start code search mode, i.e., signal V_IN is set again to a low state and the next data (for example video) is not taken into account.

If the erroneous data is a video data (data Video-E in FIG. 9), the state machine 40 can be authorized to continue to store the current packet to prevent the loss of all the data of the packet, while warning the user by generating an interrupt and performing the following operation: the erroneous byte and the next three bytes of flow 21 are replaced, in signal DATA_IN, with the sequence "00 00 01 B4", which forms a reserved code that indicates to the video decoder 28, through register 22, the occurrence of an error in the data flow.

If the erroneous data is an audio data (case not shown in FIG. 9), no special processing is performed, since MPEG standards provide no specific code for an error in the audio data flow.

The practical implementation of the state machine 40 can be achieved by those skilled in the art taking into account the above functional description.

An advantage of the present invention is that the device is, upon powering on, preset to accept any non-demultiplexed MPEG data flow and to distribute the video packets and audio packets to the respective decoders 28 and 29 when the packets are respectively flagged by codes E0 and C0, which is the most frequent case. Thus, the user only needs to specifically configure the demultiplexer for particular cases of data flow. In addition, when special configuration is desired, the configuration is particularly simple, and can be performed by register 41. The state machine 40 according to the invention avoids the conventional need for fastidious programming of a microprocessor and spares microprocessor calculation time.

As is apparent to those skilled in the art, various modifications can be made to the above disclosed preferred embodiments. In particular, the various described components can be replaced with other elements having the same function. In addition, the demultiplexing device according to the invention applies both when the data flow is encoded according to MPEG1 or MPEG2 standards, because register 41 (FIG. 5) permits configuration of the state machine 40 as a function of the MPEG1 or MPEG2 standard according to which standard the data is encoded. Furthermore, the size of the various registers depends on the characteristics, particularly the processing speed, of the MPEG decoder with which the demultiplexing device according to the invention is associated. Similarly, the invention applies independently of the number of bits on which the data are encoded, e.g. 8 bits, 16 bits, etc., by adequately adjusting the registers and the state machine.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A device for demultiplexing data encoded, in the form of a data flow in system and picture packets, according to a MPEG standard, including a hardwired state machine which receives said data flow and searches for packet start codes for routing said packets, according to the content of said packet start codes, to various registers, some of the registers being accessible in read mode by a RAM and, some other registers being accessible in read mode by a microprocessor.

2. The demultiplexing device of claim 1, associated with a first buffer register for containing packets of video data of a same type, with a second buffer register for containing packets of audio data of a same type, and with a third buffer register for containing at least picture packets of a different type, said first and second buffer register being accessible, in read mode, by said RAM, and said third buffer register being accessible, in read mode, by said microprocessor.

3. The demultiplexing device of claim 2, including a register for counting the length of said packets to switch said state machine between an operation mode wherein the state machine searches for the occurrence of a packet start code and an operation mode wherein the state machine transfers the data to one of said buffer registers.

4. The demultiplexing device of claim 3, including means so that, in the data transfer mode, the storing of data in one of said first three buffer registers includes the storing of the start code of the related packet.

5. The demultiplexing device of claim 4, wherein said means include a first shift register for shifting data provided by said state machine and a second shift register for shifting signals for controlling the writing in said first three buffer registers, said second shift register being associated with a multiplexer inhibiting, during the first three bytes of each packet start code the shift achieved by said register.

6. The demultiplexing device of any of claim 2 to 5, wherein said third buffer register is designed to contain all the packets of the data flow which are not routed, by the state machine, to one of the first two buffer registers.

7. The demultiplexing device of claim 3, further comprising:
fourth and fifth buffer registers, coupled to the state machine and the microprocessor, to store time strobes present in picture packets stored in said first and second buffer registers, said fourth and fifth buffer registers being controlled, in write mode, by said state machine and being accessible, in read mode, by said microprocessor.

8. The demultiplexing device of claim 3, further comprising a register, coupled to the state machine and the microprocessor, to store time strobes present in system packets, said register being accessible by said microprocessor.

9. The demultiplexing device of claim 3, further comprising a register, coupled to the state machine and the microprocessor, the register being programmable by said microprocessor, to configure the state machine.

10. The demultiplexing device of claim 3, further comprising a register of interrupts generated by said state machine, said interrupt register being accessible by said microprocessor.

11. The demultiplexing device of claim 10, further comprising an error input, adapted to receive an error signal generated by a device which transmits said data flow, said error signal being interpreted by said state machine, wherein the state machine can stop, by itself, a transmission of data to one of said first three buffer registers and search for a new packet start code upon interpretation of the error signal.

* * * * *